MULTIPLE STATION INTERCOMMUNICATION SYSTEM

Filed Oct. 3, 1957 4 Sheets-Sheet 1

INVENTORS
ANGUS W. BLOW
ADOLPH A. BAKER
BY Richard G. Stahr
ATTORNEY

Oct. 3, 1961 A. A. BAKER ET AL 3,003,038

MULTIPLE STATION INTERCOMMUNICATION SYSTEM

Filed Oct. 3, 1957 4 Sheets-Sheet 2

Oct. 3, 1961    A. A. BAKER ET AL    3,003,038

MULTIPLE STATION INTERCOMMUNICATION SYSTEM

Filed Oct. 3, 1957    4 Sheets-Sheet 4

3,003,038

MULTIPLE STATION INTERCOMMUNICATION SYSTEM

Adolph A. Baker and Angus W. Blow, Rochester, N.Y., assignors to General Dynamics Corporation, Rochester, N.Y., a corporation of Delaware Filed Oct. 3, 1957, Ser. No. 688,063
7 Claims. (Cl. 179—17)

Figure 1:
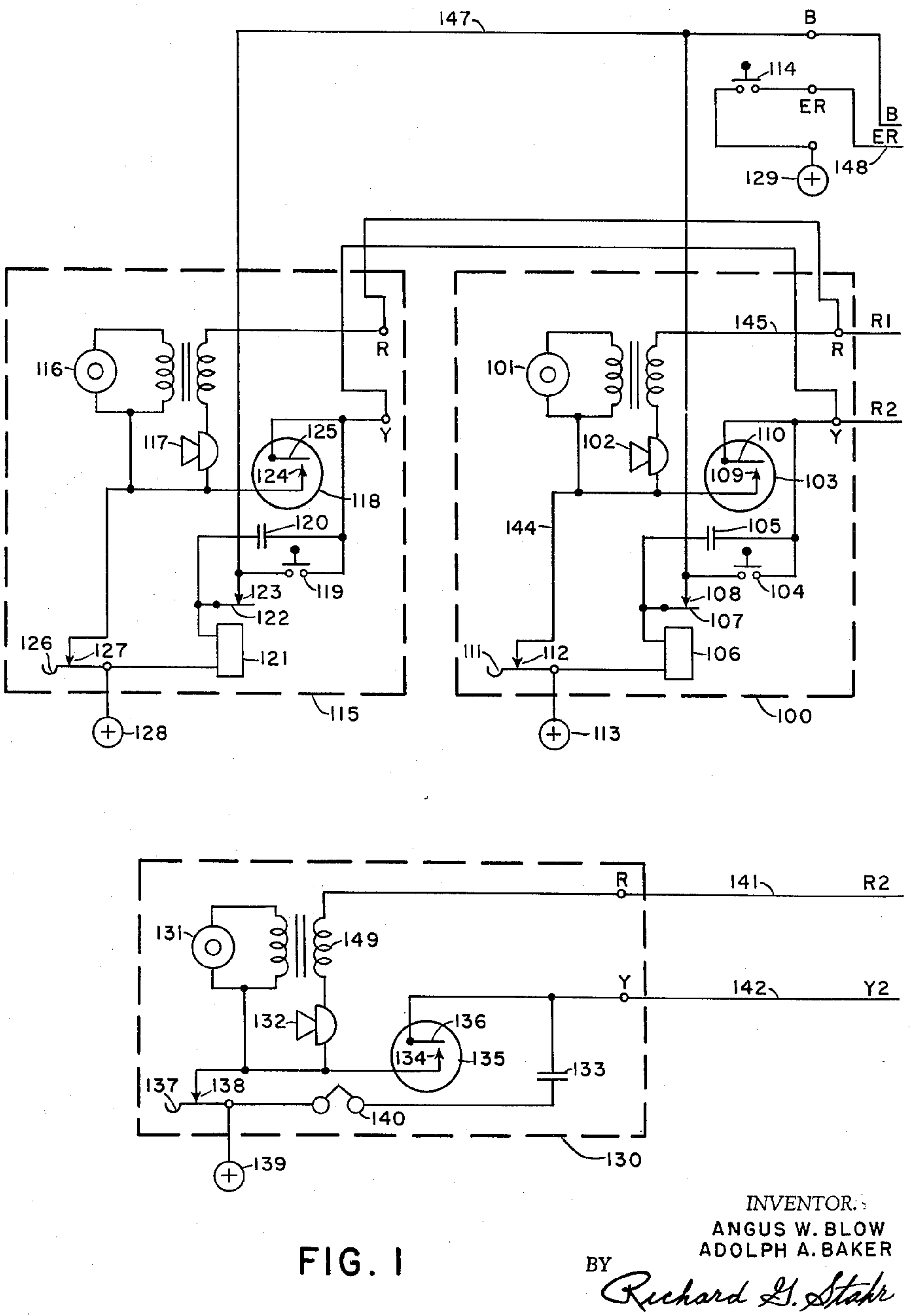

The present invention relates to multiple station line intercommunication systems and, more specifically, to intercommunication systems of the single link type having a telephone instrument at each station.

Single link intercommunication systems provide only one intercommunicating circuit to which the telephone instruments located at all stations are connected. During a period of intercommunication between any of the stations connected thereto, the remaining stations, in addition to being precluded from using the system for intercommunication with other stations, may also listen in on the conversation which is taking place between any of the other stations. The use of this type system for messages of a confidential nature, therefore, is highly impractical or even impossible, thereby limiting the usefulness of the system.

The single voice circuit feature of single link systems presents another problem in the event one of the station lines of the intercommunication system is assigned to an executive or a person of authority. Not only must the annoyance of waiting until the intercommunication circuit is clear be tolerated, but numerous occasions may arise which may require that this station have immediate access to the circuit, further limiting the desirability of a single link system.

Another limitation of the single link system arises where the station line which may be assigned to an executive or person of authority has connected thereto an extension station for an assistant or a secretary. In this instance, not only is it imperative that local intercommunications between the executive station and its associated extension station be not overheard at other stations on the line, but the intercommunication circuit should be free for communications between other stations at this time.

Single link intercommunication systems, therefore, have generally been subjected to the objections of lack of privacy, the absence of a provision for executive right-of-way, and no provision for releasing the intercommunicating circuit to other stations while a local intercommunication is taking place between the executive station and its associated extension station.

Accordingly, it is an object of this invention to provide a single link intercommunication system which will obviate the disadvantages of the prior art.

It is another object of this invention to provide a single link intercommunication system which will afford the feature of privacy.

It is another object of this invention to provide a single link intercommunication system which features an executive right-of-way.

It is another object of this invention to provide a single link intercommunication system which includes a provision for releasing the intercommunication line during periods of local communication between an executive station and its associated extension station.

In accordance with this invention, a step switch having a plurality of movable contacts and a plurality of stationary contacts associated with each movable contact is employed. One of the movable contacts of this step switch and its associated stationary contacts serves to complete the intercommunication circuit between a calling and a called station. The talking conductor of each station line is connected to a corresponding stationary contact of the step switch. Also, the talking conductors of all station lines are connected to the step switch movable contact associated with the stationary contacts to which the individual talking conductors are connected, through a pair of normally open contacts of a relay, which will hereinafter be termed a lockout relay, peculiar to each station line. Therefore, to complete an intercommunication circuit between station lines, this lockout relay must be operated. The series of lockout relays, peculiar to each station line, are so interconnected in relation to each other, through two pairs of normally closed contacts on each relay, to provide a lockout chain which precludes the operation of more than one of the lockout relays in the chain at any one time. Only through this expedient, all station lines are prevented from being connected to the intercommunication circuit while a circuit is completed between any two other stations. To complete a call, the calling station need only dial the number of the desired called station and the movable contact of the step switch is moved out to and rests upon the associated stationary contact to which the talking conductor of the called station is connected. An intercommunication circuit is thereby completed, permitting communication between the calling and called stations. Since the talking conductors of all other station lines are now open at the corresponding stationary contacts of the step switch and also at the normally open contacts of the relays of the lockout chain peculiar to each station, and since these relays will not operate while any one of them has operated, no other station line may become connected to the intercommunication circuit, insuring the feature of privacy. A busyout relay, which is operated from the executive station, serves the dual function of isolating the executive station and its associated extension station from the intercommunication circuit, thereby providing for private local communications between these two stations, and also releases the lockout relay of the executive station line so that the intercommunicating circuit may now be used by any other pair of station lines. A line seizure relay is also provided and may also be operated from the executive station. The operation of this relay, during a period of intercommunication between any two stations except the executive station, releases the lockout relay peculiar to the calling station line, thereby interrupting the intercommunicating circuit between the two communicating stations and permits the lockout relay of the executive station to pull in, thereby connecting the executive station to the intercommunication circuit, to the exclusion of all other lines.

Figure 2:
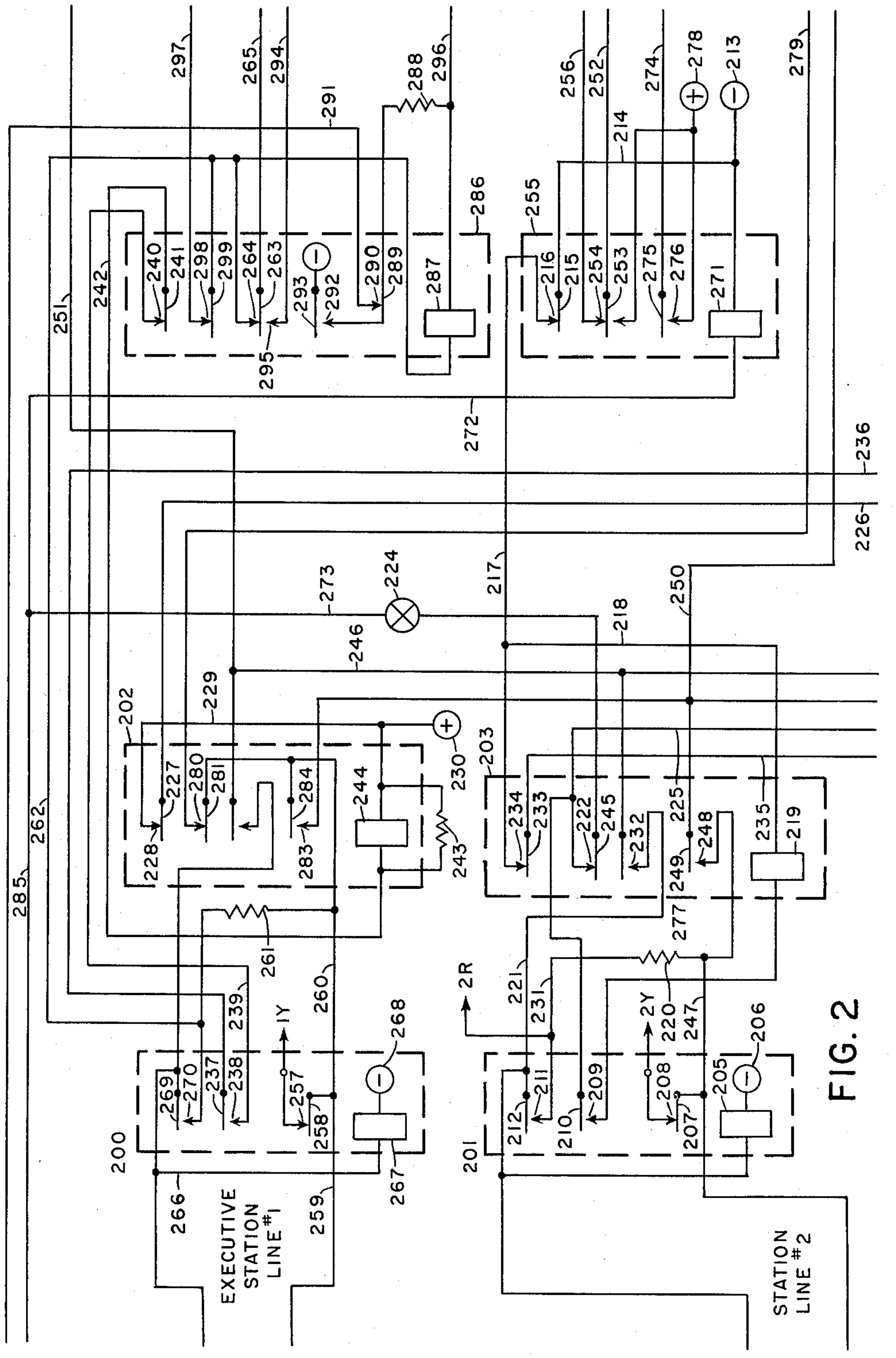
Figure 5:
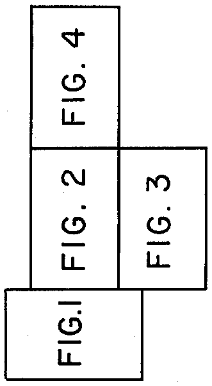
Figure 3:
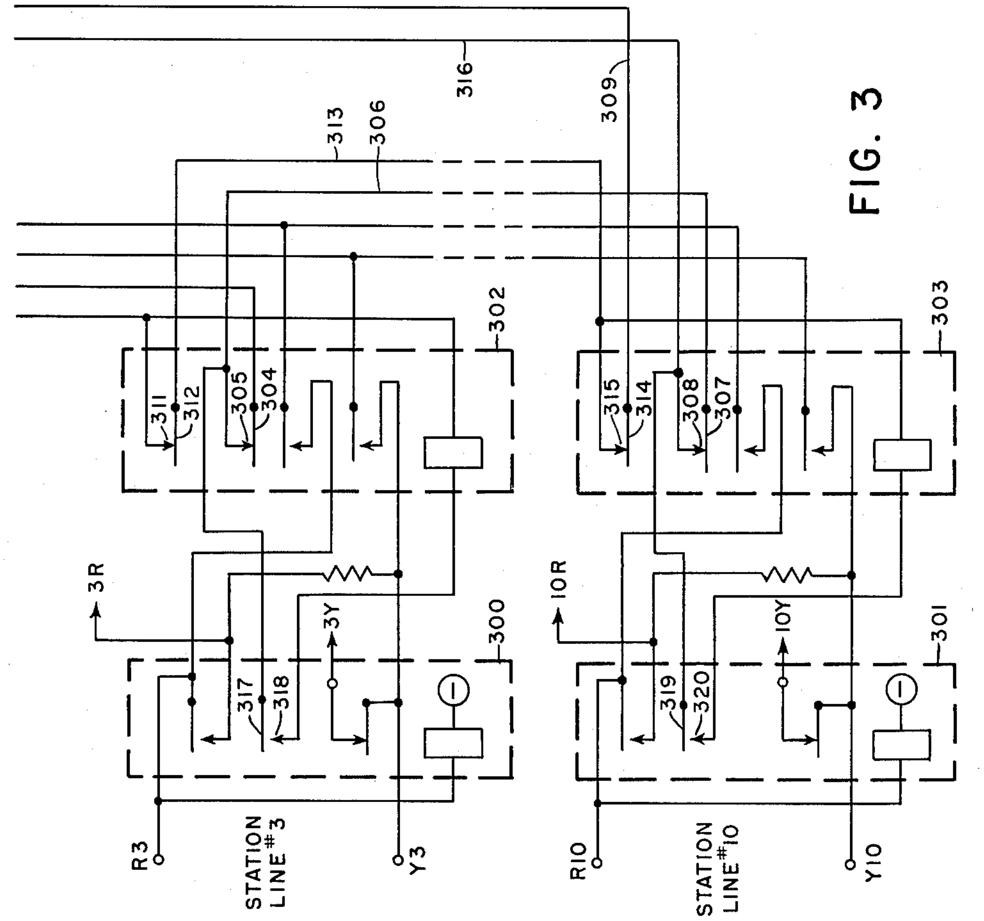
Figure 4:
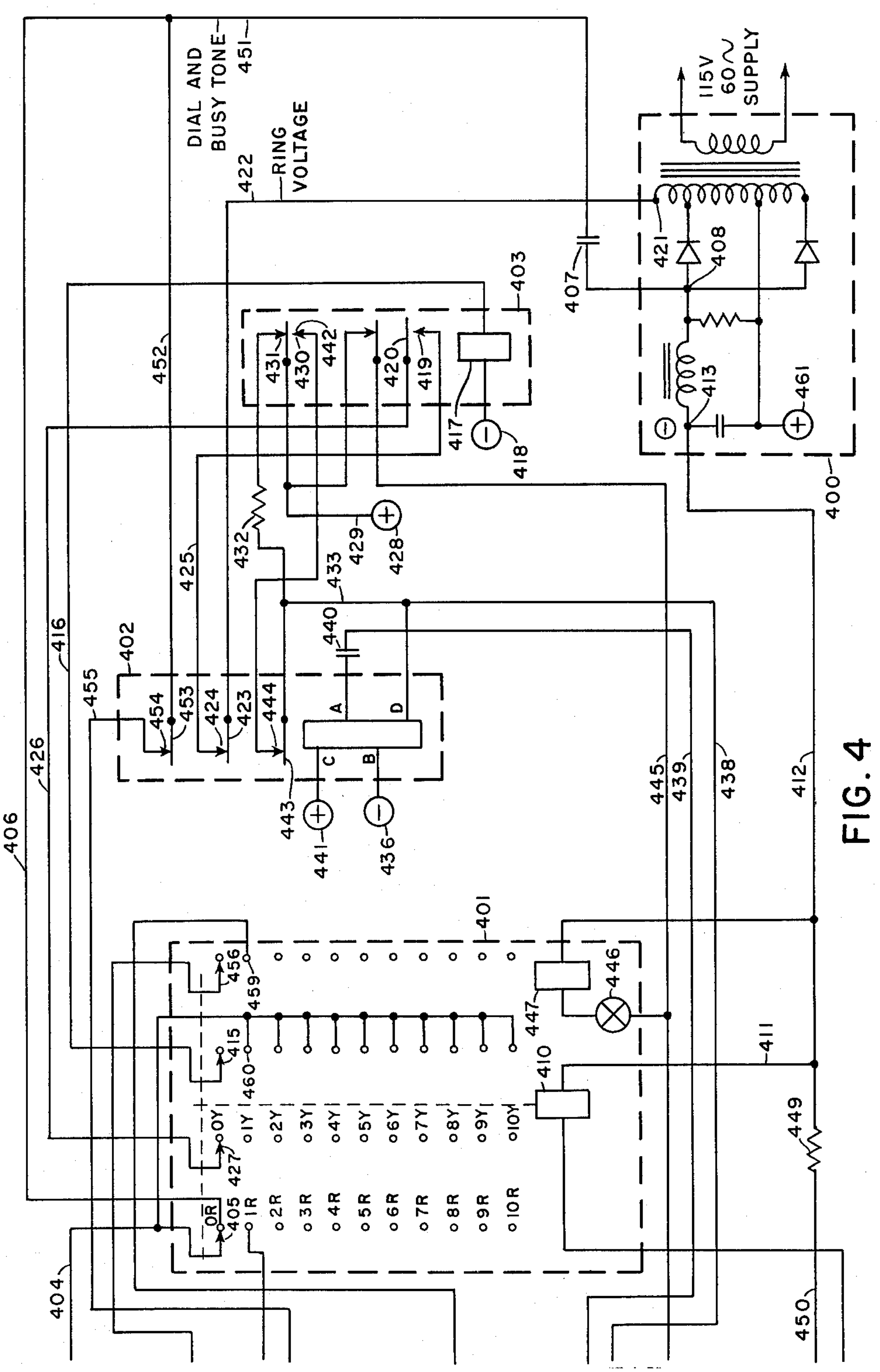

For a better understanding of the present invention, together with further objectives, advantages, and features thereof, reference is made to the following description and accompanying drawings, in which:

FIGURE 1 of the drawings is a schematic diagram of the telephone instruments which may be used in carrying out this invention, FIGURE 2 is a schematic diagram of a portion of the wiring and switching equipment contained in the central switchboard, FIGURE 3 is a schematic diagram of another portion of the wiring and switching equipment contained in the central switchboard, FIGURE 4 is a schematic diagram of the final portion of the wiring and switching equipment contained in the central switchboard, FIGURE 5 is a diagram which illustrates the position of FIGURES 1, 2, 3 and 4 relative to each other.

While the present description is in reference to an application of this invention to a single link, ten station intercommunication system featuring an executive right-of-way and a method of releasing the talking link for intercommunication between other stations when the executive station and its associated extension station are communicating locally with each other, it is to be understood that the principles of this invention may be used with any intercommunication system in which these features are desirable.

FIGURE 1 indicates, schematically, at 100 the telephone instrument which may be used with the executive station line number 1 and at 115 the telephone instrument which may be used with the extension station associated with the executive station. It can be seen that these instruments are identical and that the extension station instrument is connected in parallel to the instrument which is connected to executive station line number 1. Also, at 130, FIGURE 1, is shown a schematic diagram of the telephone instrument which may be connected to the remaining nine station lines of this intercommunication system. As all of these instruments may also be identical, only one schematic diagram has been here indicated.

FIGURES 2, 3 and 4 indicate, schematically, the wiring, switching equipment and power supply of this system, all of which are contained in a central switchboard. In these figures, each station line is labeled and has been terminated at R and Y terminals. These terminals have further been assigned subscripts 1, 2, 3, etc., corresponding to station lines 1, 2, 3, etc. While the connections between the station line terminals, FIGURE 2, and the instrument terminals, FIGURE 1, have not been shown, it is to be understood that the R and Y terminals of each instrument in FIGURE 1 are connected to the corresponding R and Y terminals of the respective station lines of FIGURE 2. This connection is made by standard three-conductor telephone lines, two of the conductors of which are connected to the corresponding R and Y terminals, respectively, as has been set forth before, while the remaining conductor is used for the purpose of extending a connection from the instrument located at each station to the positive terminal of the power supply located in the central switchboard. Symbols indicated by a negative sign enclosed in a circle indicate direct connections to the negative terminal of the power supply indicated by reference numeral 413, FIGURE 4; and positive signs enclosed in a circle indicate direct connections to the positive terminal of the power supply indicated by reference numeral 461, FIGURE 4.

In FIGURE 4, an eleven-position step switch is indicated at 401. This switch may be of any type having a plurality of movable contacts which may be successively stepped across a plurality of associated stationary contacts through the medium of energizing pulses applied to a step coil and which is provided with a restraining linkage which holds the movable contacts in their last energized position until released by the energization of a release coil. This switch is utilized for the purpose of selectively connecting each station line with any other station line in response to the calling station dialing the single digit number of the called line. The terminals labeled 1R through 10R complete a talking circuit between stations, while the terminals labeled 1Y through 10Y complete a ringing circuit between stations as the associated movable contacts are dialed out and "rest" upon the terminal corresponding to the called station line.

Associated with each station line is a line relay indicated at 200 and 201, FIGURE 2, and 300 and 301, FIGURE 3. In addition, a lockout relay is also associated with each station line, these relays being indicated at 202 and 203, FIGURE 2, and 302 and 303, FIGURE 3. While only four of each of the line relays and lockout relays have been shown in the figures, it is to be understood that one of each the lockout relays and line relays is required for each station line. Since the line and lockout relays of every station line are wired identically, for the purpose of avoiding confusion in the figures, station lines 4 through 9 have been omitted, their connections in relation to the circuit being indicated by dotted lines in FIGURE 3.

It will be noted that the respective line relays 200 and 201, FIGURE 2, and 300 and 301, FIGURE 3, each have an arrowed lead labeled 1Y, 2Y, 3Y, and 10Y, respectively. These leads are connected to the respective Y stationary contacts of the step switch 401, FIGURE 4. It may also be noted that the respective line relays, excepting the first line relay 200, also have arrowed leads labeled 2R, 3R and 10R, respectively. These leads are connected to the respective R stationary contacts of step switch 401, FIGURE 4. To simplify the various figures, these connections have not been shown, but their presence is to be understood. The R connection for line relay 200, FIGURE 2, has been indicated for the reason that an extra relay has been interposed between the line relay and the step switch, the purpose of which will be explained in detail later.

The equipment just described, that is, the line relays, the lockout chain, the step switch and the associated wiring, constitutes a link for establishing a connection between any two station lines which are connected thereto.

The power supply, which may be used in this system, is indicated at 400, FIGURE 4, and is of conventional design employing a pair of diodes and a center tapped secondary power transformer, the primary of which may be connected to any 115 volt, 60 cycle, A.-C. line.

Since the system shown here is of the single link type, that is, only one communication circuit, a method of preventing the connection of every station line to the communication circuit while any two stations are intercommunicating, thereby providing a privacy feature, is employed. To do this, a lockout chain has been provided which consists of a lockout relay associated with each station line, as has been brought out before. Each of these lockout relays is provided with two pair of normally open contacts and two pair of normally closed contacts. The two pair of normally closed contacts of each lockout relay are employed for the lockout chain connections. The positive terminal of the power supply may be traced from reference numeral 230, FIGURE 2, through line 229, normally closed contacts 228 and 227 of the lockout relay 202 associated with the executive station line 1, through line 226, line 316, FIGURE 3, normally closed contacts 308 and 307 of lockout relay 303 associated with station line 10, line 306, normally closed contacts 305 and 304 of lockout relay 302, line 325, line 225, FIGURE 2, to stationary contact 222 of lockout relay 203 associated with station line 2. The negative terminal of the power supply may be traced from reference numeral 213, FIGURE 2, line 214, normally closed contacts 215 and 216 of relay 255, line 217, normally closed contacts 234 and 233 of lockout relay 203, line 235, line 310, FIGURE 3, normally closed contacts 311 and 312 of lockout relay 302, line 313, normally closed contacts 315 and 314 of lockout relay 303, line 309, line 236, FIGURE 2, normally open contacts 237 and 238 of line relay 200, line 239, normally closed contacts 240 and 241 of relay 286, line 242, to the operating coil 244 of lockout relay 202. Each of the operating coils of the respective lockout relays are connected in parallel across the circuits which have just been traced. It may be seen, therefore, that the operation of any lockout relay will open the normally closed contacts associated therewith, thereby interrupting both the positive and negative circuits to the remaining lockout relay operating coils. In this manner then, the operation of any lockout relay breaks the energizing circuit to every other lockout relay operating coil thereby preventing operation.

For the purpose of illustrating this invention, a call will be traced from a calling to a called station. Assuming that station line 2 wishes to call executive station line 1, upon removing the receiver from the cradle of the telephone instrument as indicated at 130, FIGURE 1, the operating coil 205, FIGURE 2, of the associated line relay 201, is placed across the power supply 400, FIGURE 4. This circuit may be traced from the positive terminal of the power supply indicated at reference numeral 139, FIGURE 1, through the closed hook switch contacts 137 and 138, through the carbon of transmitter 132, line 141, the R2 terminal of station line 2, FIGURE 2, line 204, to the operating coil 205 of line relay 201, and to the other terminal of the power supply indicated at reference numeral 206. The operation of line relay 201 immediately interrupts the ring circuit for station line 2 at normally closed contacts 207 and 208 which have now been opened. Normally open contacts 211 and 212, which have now been closed, establishes a circuit across resistor 277 which provides a ring-back tone to the calling instrument. Normally open contacts 209 and 210 are also closed establishing an energizing circuit across operating coil 219 of lockout relay 203 which may be traced from the positive terminal of the power supply indicated at reference numeral 230, through the normally closed contacts 228 and 227 of lockout relay 202, line 226, line 316, FIGURE 3, normally closed contacts 308 and 307 of lockout relay 303, line 306, the normally closed contacts 305 and 304 of lockout relay 302, line 325, line 225, FIGURE 2, line 221, through now closed contacts 210 and 209 of line relay 201, line 220, to operating coil 219 of lockout relay 203, through line 218, line 217, normally closed contacts 216 and 215 of relay 225, to the negative terminal of the power supply indicated at reference numeral 213.

The operation of lockout relay 203 opens the energizing circuits for the operating coils of the remaining relays in the lockout chain in a manner as has been described before in that its normally closed contacts 222, 223 and 234 have now been opened interrupting the negative circuit to the energizing coil of all other lockout relays.

The energization of lockout relay 203 closes its normally open contacts 232 and 245 which places a dial tone on the R2 terminal of calling station line 2 and, hence, producing an audible tone at the receiver 131, FIGURE 1, of the instrument 130. This circuit may be traced from point 408, FIGURE 4, on power supply 400, through capacitor 407, line 451, line 406, to the first or "rest" stationary contact OR of step switch 401, movable contact 405, line 404, line 251, FIGURE 2, line 246, contacts 245 and 232 of lockout relay 203, line 231, to terminal R2 of station line 2, line 141, FIGURE 1, to receiver 131 of instrument 130 through coupling transformer 149. Should the intercommunication circuit be in use between any two other stations at this time, this dial tone would not be heard in that the circuit would be broken at two points. Lockout relay 203, of course, would not become energized, hence, the normally open contacts 232 and 245 would remain open. In addition, since the movable contacts of step switch 401, FIGURE 4, would now be stepped away from the rest position which would also interrupt the dial tone circuit at stationary contact OR. In this system, then, the absence of a dial tone indicates a busy condition.

The operation of lockout relay 203 also closes normally open contacts 248 and 249, establishing, but not completing, a dial out circuit to the step coil 410, FIGURE 4, of step switch 401. This circuit may be traced from the positive terminal of the power supply indicated at reference numeral 139, FIGURE 1, through closed hook switch contacts 137 and 138, to the dial 135 of instrument 130, through the normally open dial contacts 134 and 136, line 142, to the Y2 terminal of station line 2, FIGURE 2, line 247, closed contacts 248 and 249 of lockout relay 203, line 250, line 409, FIGURE 4, step coil 410, line 411, line 412, to the negative terminal of the power supply indicated at reference numeral 413. Since station number 1 is to be called, dial 135, FIGURE 1, is operated in a conventional manner. As the dial is released and allowed to return to its normal position, normally open contacts 134 and 136 are momentarily closed once, thereby energizing step coil 410, FIGURE 4, during the period which they are closed, through the circuit as has just been described. As step coil 410 is energized once, the movable contacts of step switch 401 are advanced to their first position, where they remain until the completion of the call, at which time they are released to return to their normal position through the energization of release coil 447 in a manner to be explained later.

As the movable contacts of step switch 401 are advanced to their first position in response to the dial impulse initiated by the instrument connected to station line 2, the dial tone circuit, previously described, is broken at stationary contact OR while movable contact 415 has been advanced to and rests upon stationary contact 460. This completes an energizing circuit across the operating coil 417 of ring start relay 403. This circuit may be traced from the positive terminal of the power supply indicated at 139, FIGURE 1, through the closed hook switch contacts 137 and 138, the carbon of transmitter 132, line 141, to the R2 terminal of station line 2, FIGURE 2, through line 231, through the now closed contacts 232 and 245 of lockout relay 203, line 246, line 251, line 404, FIGURE 4, line 414, to stationary contact 460, of step switch 401, movable contact 415 of step switch 401, line 416, to the operating coil 417 of ring start relay 403, to the negative terminal of the power supply indicated at reference numeral 418. It should be noted at this time that all of the stationary contacts associated with stationary contact 460 are tied together thereby permitting the completion of the energizing circuit just described when movable contact 415 is stepped out to any position.

As ring start relay 403 is energized, the operation of ring interrupter relay 402 is initiated. Ring interrupter relay 402 operates on the capacitor charge and discharge principle in a conventional manner and is employed for the purpose of interrupting the ring voltage and applying it to the line in shortp pulses separated by a period of delay. In this circuit, the operating coil 435 of ring relay 402 is maintained in an energized condition at all times during which the power supply is energized. This energizing circuit may be traced from the positive terminal of the power supply indicated at reference numeral 428, through line 429, through normally closed contacts 430 and 431 of ring start relay 403, resistor 432, line 433, through the DB winding of operating coil 435 to the negative terminal of the power supply indicated at 436. It can be seen that this circuit forms a voltage divider network, the voltage across the resistor 432 being impressed upon capacitor 440 in that capacitor 440 is connected across resistor 432 through the circuit which may be traced from point 437, line 433, line 438, normally closed contacts 253 and 254 of relay 255, FIGURE 2, line 256, line 439, FIGURE 4, capacitor 440, winding A.-C. of operating coil 435, to the positive terminal of the power supply indicated at reference numeral 441. In its quiescent state, therefore, ring interrupter relay 402 is in an energized condition and capacitor 440 is changed to the potential appearing across resistor 432. As ring start relay 403 is energized in a manner as has been previously described, movable contact 430 operates to its alternate position, breaking its contact with stationary contact 431 thereby interrupting the energizing circuit across the DB winding of operating coil 435. Although movable contact 430 immediately establishes a contact with its associated stationary contact 442, the energizing circuit across the DB winding remains interrupted in that the normally closed contacts 443 and 444 of ring interrupter relay 402 are also open in that ring interrupter relay is in an energized condition. Although the interruption of the energizing circuit of the DB winding would ordinarily permit the ring interrupter relay to immediately drop out, the continuing charge on capacitor 440 is now permitted to flow through the DB winding thereby holding the ring interrupter relay closed until capacitor 440 has become fully charged thereby delaying the start of the ring interrupter relay 402. This delay is necessary to prevent the operation of ring interrupter relay 402 for a period of time long enough to permit movable contacts of step relay 401 to advance to their last position so that ring voltage will not be applied to each of the Y stationary contacts as the movable contact 427 is stepped past them. To step the movable contacts of step switch 401 to their last position requires one second of time. Therefore, a delay period of one and one-half seconds after the first dial pulse affords ample time for the movable contacts of step switch 401 to be advanced to any position before the ring interrupter relay starts, thereby applying ring voltage pulses to the line. By proper selection of values for resistor 432 and capacitor 440, the proper delay may be realized. After the ring interrupter relay has started, a pulsing ring voltage is applied to the Y stationary contact, upon which movable contact 427 rests, which corresponds to the dialed station, which, in this instance, is executive station line 1. Ring interrupter relay 402 continues to operate until the energizing circuit across ring start relay 403 has been broken at the completion of a call in a manner to be described later.

As ring start relay becomes energized, its normally open contacts 419 and 420 are also closed. This completes a circuit for applying ring voltage to the movable contact 427 of step switch 401. This circuit may be traced from point 421 on the secondary winding of the power transformer in the power supply 400, through line 422, through contacts 423 and 424 of ring interrupter relay 402, line 425, contacts 419 and 420 of ring start relay 403, line 426, movable contact 427 of step switch 401 to the Y stationary contact upon which it rests, which, in this instance, is contact 1Y. This circuit is further extended to the arrowed lead labeled 1Y, FIGURE 2, of executive station line number 1 through the connection which has previously been described but which has not been shown, through normally closed contacts 257 and 258 of line relay 200 of executive station line number 1, through line 259, to the Y1 terminal, through line 143, FIGURE 1, capacitor 105, buzzer coil 106, to the positive terminal of the power supply indicated at reference numeral 113. This alternating ring voltage operates buzzer 106 thereby indicating a call for executive station line 1.

As the receiver is removed from the cradle of instrument 100, hook switch contacts 111 and 112 are permitted to close. This completes a circuit across the operating coil 267, FIGURE 2, of line relay 200 which may be traced from the positive terminal of the power supply indicated at reference numeral 113, through contacts 111 and 112, line 144, the carbon of transmitter 102, line 145, to the R1 terminal of executive station line 1, FIGURE 2, line 266, through operating coil 267 to the negative terminal of the power supply indicated at reference numeral 268. As line relay 200 operates, normally closed contacts 257 and 258 are opened, thereby interrupting the ring voltage circuit to executive station line 1. The operation of line relay 200 also completes a talking circuit through the now closed contacts 269 and 270. This circuit may be traced from the transmitter 102 of instrument 100, FIGURE 1, through line 145, to terminal R1 of executive station line 1, FIGURE 2, through contacts 269 and 270, line 262, normally closed contacts 263 and 264 of busy out relay 300, line 265, to the stationary contact 1R of step switch 401, FIGURE 4. Since movable contact 405 of step switch 401 is resting on stationary contact 1R, having been advanced to this position through the operation of step coil 410 in a manner previously described, the talking circuit is further completed to the instrument connected to calling station line 2 through movable contact 405, line 404, line 251, FIGURE 2, line 246, closed contacts 232 and 245 of lockout relay 203, line 231, to the R2 terminal of station line 2, through line 141, FIGURE 1, to the receiver 131 of instrument 130, which is connected to station line 2, through coupling transformer 149.

At the completion of this call, and both receivers are returned to their cradles, the hook switch contacts in each instrument are broken thereby removing the positive terminal of the battery from the operating coils of the respective associated line relays thereby permitting them to drop out. As line relay 201, FIGURE 2, of station line 2 drops out, the energizing circuit of its associated lockout relay operating coil 244 is also interrupted by the opening of contacts 209 and 210, thereby permitting the lockout relay 203 to drop out. As lock relay 203 drops out, its normally closed contacts 222 and 223 close, thereby completing an energizing circuit across the operating coil 271 of line seizure relay 255. This circuit may be traced from the positive terminal of the power supply indicated at reference numeral 230, line 229, contacts 228 and 227 of lockout relay 202, line 226, line 316, FIGURE 3, contacts 308 and 307 of lockout relay 303, line 306, contacts 305 and 304 of lockout relay 302, line 325, line 225, FIGURE 2, contacts 222 and 223 of lockout relay 203, to contact 224. Contact 224 is an off-normal closed contact located on step switch 401, FIGURE 4, but which has been shown in this position for the purpose of simplifying this schematic diagram. This contact is open only when the movable contacts of step switch 401 are in their "rest" position but is closed while the movable contacts of step switch 401 are in every other position. Since the movable contacts of step switch 401 are now in their number 1 position, this contact is closed thereby permitting the completion of the energizing circuit being described through line 273, line 272, to operating coil 271 of line seizure relay 255 to the negative terminal of the power supply indicated at reference numeral 213. As line seizure relay 255 operates, its normally closed contacts 275 and 276 are closed completing an energizing circuit across release coil 447, FIGURE 4, of step switch 401 which may be traced from the positive terminal of the power supply indicated at reference numeral 278, contacts 276 and 275, line 274, line 445, FIGURE 4, through contact 446 which is another off-normal closed contact on step switch 401 as described before and which is now closed in that the movable contacts of step switch 401 are not in their "rest" position, through release coil 447, line 448, line 412, to the negative terminal of the power supply indicated at reference numeral 413. As release coil 447 is energized, the movable contacts of step switch 401 are spring returned to their "rest" position. As the movable contacts of step switch 401 return to their "rest" position, the energizing circuit across the operating coil 417 of ring start relay 403 is broken by the opening of contacts 415 and 460, thereby permitting the ring interrupter relay to stabilize in an energized position and conditioning the system for the completion of another call.

In the event the executive station line wishes to initiate a call for local communication with its associated extension station, after the receiver of the instrument shown at 100, FIGURE 1, has been removed from its cradle, hook switch contacts 111 and 112 close. This completes an energizing circuit across the operating coil 267 of line relay 200, FIGURE 2, of the executive station line 1 in an identical manner as has previously been explained in connection with station line number 2. The operation of this line relay 200 opens its normally closed contacts 257 and 258 thereby interrupting the ring circuit of this station line. Assuming for the moment that a talking circuit is complete between any other two station lines, the lockout relay 202 of executive station line 1 will not operate even though the normally open contacts 237 and 238 of line relay 200 have closed in that the energizing circuit of the operating coil 244 of lockout relay 202 has been interrupted by the operation of the lockout relay associated with the calling station line of the two lines between which the talking circuit is now complete. However, executive station line 1 may still communicate locally with the extension station line connected thereto in that they are connected in parallel as shown in FIGURE 1. For locally signaling the extension station line, momentary contact push-button 104 is provided. The depressing of push-button 104 establishes an energizing circuit across the buzzer coil 121 of instrument 115, FIGURE 1. This circuit may be traced from the positive terminal of the power supply indicated by reference numeral 128, through buzzer coil 121, through the buzzer contacts 122 and 123, line 147, line 146, momentary contact push-button 104, line 143, to the Y1 terminal of extension station line number 1, FIGURE 2, line 259, line 260, to contacts 281 and 280 of lockout relay 202 which are closed in that lockout relay 202 is in an inoperative condition, line 279, line 450, FIGURE 4, current limiting resistor 449, line 412 to the negative terminal of power supply 400 indicated at reference numeral 413. In this instance, as the receiver 116 of the instrument 115, which is connected to the extension station line, is removed from its cradle, local communication may be held between the instrument on executive station line 1 and the instrument on the extension line connected thereto without disturbing the call taking place between any two other station lines in that lockout relay 202 has remained unoperated.

Assuming now that the executive station line wishes to communicate locally with the extension station line connected thereto and no other stations are connected with each other, it is desirable to do so without interfering with other calls which may be placed between any other two station lines. Therefore, as the line relay 200 of executive station line 1 is operated, in a manner as previously described, an energizing circuit is completed across the lockout relay operating coil 244 of lockout relay 202 associated with executive station line 1, by the closing of contacts 237 and 238 of line relay 200. This energizing circuit may be traced from the positive terminal of the power supply source indicated at reference numeral 230, through operating coil 244 of lockout relay 202, line 242, normally closed contacts 241 and 240 of busy out relay 286, line 239, contacts 237 and 238 of line relay 200, and line 236 through the lockout relay chain to the negative terminal of the power supply indicated by reference numeral 213 in a manner as previously explained. The energization of operating coil 244, therefore, operates lockout relay 202 thereby conditioning executive station line 1 for dialing any other station or for signaling locally the extension station line connected thereto. As has been pointed out before, in the event extension station line 1 wishes to communicate locally with the extension station line connected thereto, the lockout chain should be released so that calls may be initiated between any other two station lines. Therefore, as push-button 104, FIGURE 1, is depressed to locally signal the extension station line connected to executive station line 1, the local signaling circuit to extension station line is completed in the same manner as described before. Since the lockout relay 202, FIGURE 2, is also operated at this time, the depression of push-button 104, FIGURE 1, also completes an energizing circuit across operating coil 287 of busy-out relay 286. This circuit may be traced from the positive terminal of the power supply indicated at reference numeral 113, FIGURE 1, through closed hook switch contacts 111 and 112, line 144, the carbon of transmitter 102, line 145, to the R1 lead of executive station line number 1, FIGURE 2, contacts 269 and 270 of line relay 200, line 262, operating coil 287, resistor 288, contacts 289 and 290 of busy-out relay 286, line 291 to the B terminal, line 146, FIGURE 1, through momentary depressed push-button 104, line 143, to the Y1 lead, FIGURE 2, of executive station line 1, line 260, through closed contacts 284 and 283 of lockout relay 202, line 282, line 250, line 409, FIGURE 4, through step coil 410, line 411, line 412, to the negative terminal 413 of power supply 400. While this also completes a circuit through step coil 410, step coil 410 will not operate in series with operating coil 287 of busy-out relay 286. As busy-out relay 286 operates, its associated normally closed contacts 240 and 241 are opened, breaking the energizing circuit for lockout relay operating coil 244 permitting it to drop out, thereby conditioning the lockout chain to permit the completion of a communication circuit between any other two stations. The operation of the busy-out relay 286 through the depression of the local signaling push button, therefore, disassociates executive station line 1 from the lockout chain. As the momentary contact push-button 104 is released, the operation of busy-out relay 286 closes a holding circuit on energizing coil 287 through contacts 292 and 293 to the negative terminal of the power supply as indicated.

So that any other station may not complete a call to executive station 1 during local intercommunication with the extension station line connected thereto, a busy signal is placed on the 1R terminal of step switch 401, FIGURE 4. In the event any station should dial the executive station line 1 during a period of local intercommunication with the extension station line connected thereto, the sequence of initiating a call will be repeated as previously described in connection with station line number 2 to the extent that the removable contacts of step switch 401, FIGURE 4, will be advanced to their number 1 position, the ring start relay 403 will be energized, and the operation of the ring interrupter relay 402 will be initiated. However, in this condition, a busy tone is placed on stationary contact 1R of step switch 401 through a circuit which may be traced from point 408, FIGURE 4, of power supply 400, through capacitor 407, line 451, line 452, through pulsating contacts 453 and 454 of ring interrupter relay 402, line 455, line 294, FIGURE 2, through now closed contacts 295 and 263 of busy-out relay 286, through line 265, to the 1R stationary contact of step switch 400, FIGURE 4, through movable contact 405, which is now resting on stationary contact 1R, line 404, line 251, FIGURE 2, line 246, through contacts 245 and 232 of lockout relay 203 of station line 2, through line 231, to the R2 terminal, to line 141, FIGURE 1, to the receiver 131 of the instrument 130 connected to station line 2. This dial tone circuit has been traced back to station line 2 under the assumption that the call had originated from that station line. This circuit may also be traced back to all other station lines, in a similar manner, should the call have originated from any one of them.

The operation of the busy-out relay 286, FIGURE 2, thereby disassociating executive station line 1 from the lockout chain, when the executive station line 1 locally signals the extension station line connected thereto for local intercommunications, has just been described. However, in the event any other station line has established a talking circuit with executive station line 1 and now the executive station line 1 wishes to signal locally the extension station line connected thereto for intercommunication between all three stations, the busy-out relay 286, FIGURE 2, should not operate and thereby cut off the call from the calling station line. To do this, a short circuit is placed around the operating coil 287 of busy-out relay 286 while extension station line number 1 is connected to any other station line through step relay 401, FIGURE 4, thereby preventing the operation of busy-out relay 286 in the event the extension station line connected to the executive station line is signaled locally at this time. This short circuit may be traced from one side of operating coil 287, through line 296, line 457, FIGURE 4, to stationary contact 459 of step switch 401, through movable contact 456 of step switch 401, which is now resting on stationary contact 459 in that the calling station dial has pulsed the step switch to its number 1 position, line 458, line 297, FIGURE 2, through normally closed contacts 298 and 299 of busy-out relay 286, to the other side of operating coil 287.

In the event two station lines other than the executive station line are connected for communication between them, as has been explained before, the lockout chain precludes any other station line from breaking in on the communication circuit. Should the executive station line wish to exercise its prerogative and interrupt the communication and release the lockout chain so that a call may be initiated from executive station line 1, an executive right-of-way switch 114, FIGURE 1, is provided. By depressing momentary contact button 114, an energizing circuit is placed across the operating coil of link seizure relay 255 which can be traced from the positive terminal of the power supply indicated at reference numeral 129, through momentary contact push-button 114, line 148, to the ER terminal FIGURE 2, line 285, line 272, operating coil 271, to the negative terminal of the power supply indicated at reference numeral 213. This circuit, of course, operates link seizure relay 255, thereby breaking the negative energizing circuit of all lockout relay operating coils through the opening of normally closed contacts 215 and 216 of link seizure relay 255. The operation of link seizure relay 255 also completes an energizing circuit to the release coil 447, FIGURE 4, of step switch 401 from the positive terminal of the power supply indicated by reference numeral 278 through contacts 275 and 276, line 274, line 445, FIGURE 4, through off-normal closed contact 446, described before, release coil 447, line 448, line 412, to the negative terminal of power supply 400 indicated at reference numeral 413. The operation of the release coil permits the step switch 401 to return to its "rest" position and in condition to connect another talking circuit between station lines. Since the executive station line and the two station lines which had been interconnected are now all trying to operate their respective lockout relays, all lockout relays will be pulled in, however, since this interrupts the energizing circuit to all lockout relay operating coils, they will all immediately drop out. The lockout relay coil 244 of executive station line 1, however, is shunted by resistor 243, which will tend to hold operating coil 244 closed for a short interval of time after the energizing circuit to the coil has been interrupted. Since this coil remains closed for a short period of time longer than any other of the lockout relay operating coils, it will remain operated in that the energizing circuit of its operating coil is immediately closed as the remaining lockout relays drop out ahead of it. Therefore, executive station line 1 is in a condition to initiate a call to any of the other station lines. The operation of momentary contact push push button 114, FIGURE 1, therefore, disconnects any existing communication circuit connection between any two other station lines and conditions the executive station line to establish a communication connection with any other station line.

The single link intercommunication system described herein is of the type having a plurality of station lines, to each of which is connected a telephone instrument interconnected in a common intercommunication circuit. To establish a communication and signaling circuit connection between a calling and a called station, a standard telephone step switch of the type having a plurality of movable contacts, which are advanced one positions with each energization of its associated step coil and which remains in its last energized position until released by the energization of an associated release coil, is used. The talking conductors of all station lines are connected to one of the movable contacts on this step switch and the talking conductor of each station line is also connected to respective stationary contacts on the step switch, associated with the common movable contact, corresponding to the number of the respective station lines. The signaling conductors of all station lines are similarly connected to another movable contact and associated stationary contacts on the step switch.

To initiate a call from a calling to a called station, the calling station need only dial the single digit number assigned to the called station. Normally open dial contacts in each instrument are connected into a common dial out circuit. As the dial of an instrument connected to any station line is permitted to return to its rest position after a selected number has been dialed, the normally open dial contacts of the calling instrument are successively, momentarily closed for a number of times equal to the dialed number. Each time the normally open dial contacts close, an energizing circuit is completed across the step switch step coil. Since the step coil advances the movable contacts one position with each energization, the movable contacts are, therefore, successively stepped out the dialed number of times and rest upon the associated stationary contacts to which the talking conductors and the signal conductors, respectively, of the called station are connected, thereby completing communication and signal circuits between the calling and called stations.

A lockout chain, which is operated by the act of removing the receiver of any instrument from its cradle, is provided for the purpose of preventing any station line from becoming connected to the common communication circuit while any other two lines are connected to the communication circuit, thereby insuring a feature of privacy.

One of the station lines of this system is termed an executive station line in that it is provided with an extension connected thereto and a means for signaling locally between the executive station and this extension, after which local communications may be held between the executive station and its extension over a circuit which is isolated from the common communication circuit. Since the lockout chain is operated by the removal of the receiver from its cradle of the instrument connected to the executive station line, a busy-out relay, which is energized through the local signal circuit, is provided for the purpose of releasing the lockout chain, thereby permitting intercommunications between any two other stations during local communications between the executive station and its extension.

So that the executive station line may seize the common communication circuit while any two other stations are communicating, and executive right-of-way feature is also provided. Through the operation of a momentary contact push-button at the executive station, a link seizure relay is energized. The energization of this relay resets the lockout chain, disconnects the existing communication circuit and conditions the executive station line to initiate a call to any other station line.

While I have shown and described a preferred embodiment of my invention, it will be obvious to those skilled in the art that various modifications and substitutions may be made without departing from the spirit of this invention which is to be limited only with the scope of the appended claims.

What is claimed is:

1. In an intercommunicating system, a plurality of lines including an executive line, a station connected to each of said lines including said executive line, an extension station connected to said executive line, means for signaling locally between stations on said executive line, a link for establishing a connection between a calling and a called ones of said lines, a lockout means within said link for preventing said link from establishing more than one connection at any one time between calling and called ones of said lines, means responsive to the operation of said local signaling means for rendering said lockout means nonresponsive to said executive line to enable said link to establish a connection between calling and called ones of said lines other than said executive line while the stations on said executive line are used for intercommunication purposes and means responsive to the interruption of interruption of intercommunication between stations on said executive line for rendering said lockout means responsive to said executive line.

2. In an intercommunicating system, a plurality of lines including an executive line, a station connected to each of said lines including said executive line, an extension station connected to said executive line, means for signaling locally between stations on said executive line, a link for establishing a connection between a calling and a called ones of said lines, lockout means within said link for preventing said link from establishing more than one connection at any one time between calling and called ones of said lines and means responsive to the operation of said local signaling means for rendering said lockout means non-responsive to said executive line to enable said link to establish a connection between calling and called ones of said lines other than said executive line while the stations on said executive line are used for intercommunication purposes.

3. A multiple station intercommunication system of the type having at each station a telephone instrument with signal initiating means and signal responsive means comprising, a plurality of station lines at least one of which is an executive station line, an extension station line connected to said executive station line, means to be operated for signaling locally between said executive station line and said extension station line, means associated with each station line for selectively connecting to any other station line and including a lockout means for preventing the selective connection by more than one station line to another station line simultaneously, means responsive to the operation of said local signaling means for disassociating said executive station line from said lockout means to enable connections between other station lines while said executive station line and said extension station line are used for intercommunication purposes, means for rendering said disassociating means unresponsive to the operation of said local signaling means when said local signaling means has been operated while said executive line station is connected to any other station line, and means associated with said executive station line for disconnecting any existing connection between station lines and enabling a selective connection by said executive station line to a desired station line.

4. In an intercommunicating system, a plurality of lines including an executive line, a station connected to each of said lines including said executive line, an extension station connected to said executive line, means for signaling locally between stations on said executive line, a link for establishing a connection between a calling and a called ones of said lines, a lockout means within said link for preventing said link from establishing more than one connection at any one time between calling and called ones of said lines, means responsive to the operation of said local signaling means for rendering said lockout means non-responsive to said executive line to enable said link to establish a connection between calling and called ones of said lines other than said executive line while the stations on said executive line are used for intercommunication purposes, means responsive to the interruption of intercommunication between stations on said executive line for rendering said lockout means responsive to said executive line, and means associated with said executive station line for disconnecting any existing connection between station lines and enabling a selective connection by said executive station line to a desired station line.

5. In an intercommunicating system, a plurality of lines including an executive line, a station connected to each of said lines including said executive line, an extension station connected to said executive line, means for signaling locally between stations on said executive line, a link for establishing a connection between a calling and a called ones of said lines, lockout means within said link for preventing said link from establishing more than one connection at any one time between calling and called ones of said lines, means responsive to the operation of said local signaling means for rendering said lockout means non-responsive to said executive line to enable said link to establish a connection between calling and called ones of said lines other than said executive line while the stations on said executive line are used for intercommunication purposes, and means associated with said executive station line for disconnecting any existing connection between station lines and enabling a selective connection by said executive station line to a desired station line.

6. A multiple station intercommunicating system of the type having at each station a telephone instrument with signal initiating means and signal responsive means comprising, a plurality of station lines at least one of which is an executive station line, an extension station line connected to said executive station line, means to be operated for signaling locally between said executive station line and said extension station line, means associated with each station line for selectively connecting to any other station line and including a lockout means for preventing the selective connection by more than one station line to another station line simultaneously, means responsive to the operation of said local signaling means for disassociating said executive station line from said lockout means to enable connections between other station lines while said executive station line and said extension station line are used for intercommunication purposes, and means associated with said executive station line for disconnecting any existing connection between station lines and enabling a selective connection by said executive station line to a desired station line.

7. A multiple station intercommunicating system of the type having at each station a telephone instrument with signal initiating means and signal responsive means comprising, a plurality of station lines at least one of which is an executive station line, an extension station line connected to said executive station line, means to be operated for signaling locally between said executive station line and said extension station line, means for completing an intercommunication circuit between said executive station line and said extension station line, means associated with each station line for selectively connecting to any other station line and including a lockout means for preventing the selective connection by more than one station line to another station line simultaneously, means responsive to the operation of said local signaling means for disassociating said executive station line from said lockout means to enable connections between other station lines while an intercommunication circuit is complete between said executive station line and said extension station line, means responsive to the interruption of said intercommunication circuit for reassociating said executive station line with said lockout means, and means associated with said executive station line for disconnecting any existing connection between station lines and enabling a selective connection by said executive station line to a desired station line.

References Cited in the file of this patent

UNITED STATES PATENTS

| | | |
|---|---|---|
| 1,783,310 | Saunders et al. | Dec. 2, 1930 |
| 2,137,626 | Quarg | Nov. 22, 1938 |
| 2,300,044 | Dewire | Oct. 27, 1942 |
| 2,374,072 | Beaumont | Apr. 17, 1945 |
| 2,395,155 | Voss | Feb. 19, 1946 |
| 2,549,719 | Stehlik | Apr. 17, 1951 |
| 2,619,550 | Humphries | Nov. 25, 1952 |
| 2,717,925 | Lomax | Sept. 13, 1955 |
| 2,873,316 | Power | Feb. 10, 1959 |